UNITED STATES PATENT OFFICE.

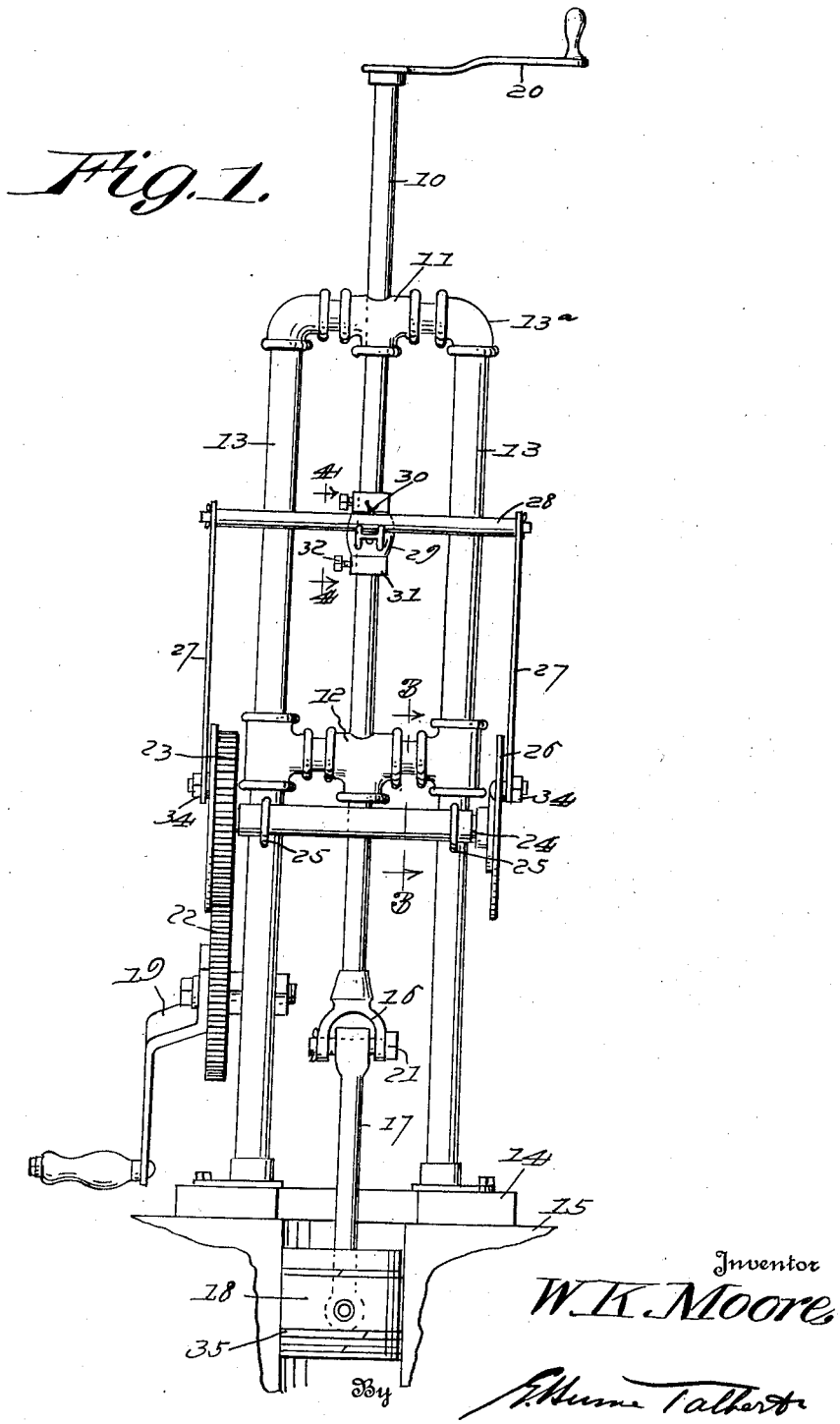
W. K. MOORE.
APPARATUS FOR DRESSING ENGINE CYLINDERS.
APPLICATION FILED MAR. 28, 1921.
1,384,625. Patented July 12, 1921.

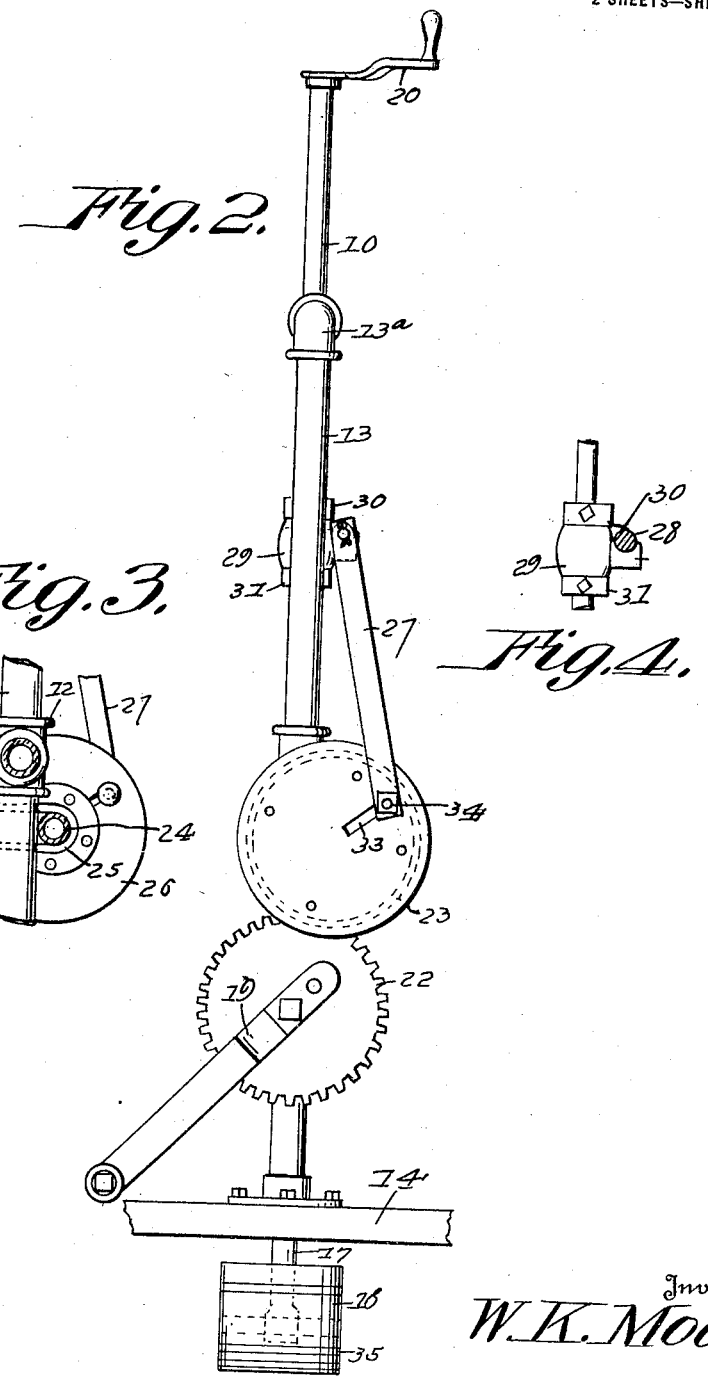

WARREN K. MOORE, OF NEW CASTLE, PENNSYLVANIA.

APPARATUS FOR DRESSING ENGINE-CYLINDERS.

1,384,625.  Specification of Letters Patent.  Patented July 12, 1921.

Application filed March 28, 1921. Serial No. 456,142.

*To all whom it may concern:*

Be it known that I, WARREN K. MOORE, a citizen of the United States of America, residing at New Castle, in the county of Lawrence and State of Pennsylvania, have invented new and useful Improvements in Apparatus for Dressing Engine-Cylinders, of which the following is a specification.

The object of the invention is to provide simple and efficient means whereby the bore of an engine cylinder may be wiped and polished or ground to remove scratches or irregularities therein due to accumulations of carbon or irregularities of packing rings and the like as a substitute for re-boring and under conditions providing for treatment by the car owner or in the ordinary repair shop or garage; and with this object in view the invention consists in a construction and combination of parts of which a preferred embodiment is shown in the accompanying drawings, wherein:—

Figure 1 is a side view of an apparatus embodying the invention applied in the operative position to a cylinder.

Fig. 2 is an edge view of the same.

Fig. 3 is a detail section on the plane indicated by the line 3—3 of Fig. 1.

Fig. 4 is a sectional view on the plane indicated by the line 4—4 of Fig. 1.

The apparatus consists essentially of an operating rod 10 mounted for reciprocatory and rotary movement in bearings 11 and 12 supported respectively at the upper end and mid-height of a frame having the uprights 13 rising from a base 14 which is adapted to be bolted, clamped or otherwise firmly secured to an engine cylinder indicated at 15, said operating rod being provided with means such as a yoke 16 for attachment to the piston rod 17 of the ordinary cylinder piston 18, in connection with means including for example a driving crank 19 and a turning crank 20 for respectively reciprocating and rotating said operating rod to communicate corresponding movements to the piston.

In the construction illustrated the supporting frame comprises tubular members connected by suitable elbows 13ª and the bearings 11 and 12 consist of three-way union or coupling members. The yoke 16 by which connection is made with the piston rod carries a transverse bolt 21 for engagement with the eye in the end of said rod. The driving crank 19 is attached to a driving gear 22 meshing with a driven gear 23 carried by a transverse shaft 24 mounted in suitable bearings 25 on the uprights of the frame, as shown in detail in Fig. 3, and crank disks 26, also carried by said transverse shaft are connected by pitmen 27 with a cross head 28 consisting of a rod engaged with a bearing block 29 on the operating rod 10. The bearing block is adjustable with relation to the operating rod by means of upper and lower collars 30 and 31 held in place by set-screws 32 to provide for varying the position of the piston in the cylinder to correspond with the zone of movement of the piston in the ordinary operation of the engine. In order to provide for varying the stroke of the piston in the operation of the apparatus to correspond with that of the piston in the ordinary operation of the engine the pitmen 27 are adjustably connected with the crank disks 26 through radial slots 33 in the latter engaged by bolts 34 forming wrist pins.

In the operation of the apparatus the piston 18 equipped with the usual or any preferred form of packing rings 35 should be inserted in the cylinder after applying to the surface thereof an abrasive or grinding compound, containing emery or any equivalent thereof, such for example as is used in valve grinding operations, and the piston should thereupon be reciprocated by means of an operating mechanism to effect a grinding and polishing of the surface of the cylinder, the operating rod being manually turned from time to time or continuously as preferred by the operation of the crank 20 until the required smoothness of the interior surface of the cylinder has been secured. Obviously by using over size piston rings the grinding and polishing operation may be continued until scratches or mutilations to which cylinders are ordinarily exposed have been entirely eliminated, to the end that an effective compression can be obtained.

Having described the invention, what is claimed as new and useful is:

1. An apparatus for the purpose described having in combination with a supporting frame and means for attaching the same to an engine cylinder, an operating rod reciprocably and rotatably mounted in bearings in said frame and provided with means for engaging a piston rod, a cross head, means for reciprocating said cross head, and means operatively connecting the cross head with the operating rod whereby the position of said rod with reference to the cross head may be varied.

2. An apparatus for the purpose described having in combination with a supporting frame and means for attaching the same to an engine cylinder, an operating rod reciprocably and rotatably mounted in bearings in said frame and provided with means for engaging a piston rod, a cross head connected with said operating rod, crank disks carried by the frame and provided with means for rotating them, and pitmen terminally connected respectively with the cross head and the crank disks, the latter being provided with radial slots to permit the connected terminals of the pitmen to be adjusted toward or away from the center of the crank disks to vary the stroke of the operating rod.

3. An apparatus for the purpose described having in combination with a supporting frame and means for attaching the same to an engine cylinder, an operating rod reciprocably and rotatably mounted in bearings in said frame and provided with means for engaging a piston rod, and means for imparting reciprocatory and rotary movement to said rod, the means for reciprocating the operating rod including crank disks, a cross head connected by pitmen with the crank disks, and a bearing block for the cross head fitted upon the operating rod.

4. An apparatus for the purpose described having in combination with a supporting frame and means for attaching the same to an engine cylinder, an operating rod reciprocably and rotatably mounted in bearings in said frame and provided with means for engaging a piston rod, and means for imparting reciprocatory and rotary movement to said rod, the means for reciprocating the operating rod including crank disks, a cross head connected by pitmen with the crank disks, and a bearing block for the cross head fitted upon the operating rod, means being provided for adjusting the position of the bearing block to vary the path of movement of the piston connected with the operating rod.

5. An apparatus for the purpose described having in combination with a supporting frame and means for attaching the same to an engine cylinder, an operating rod reciprocably and rotatably mounted in bearings in said frame and provided with means for engaging a piston rod, and means for imparting reciprocatory and rotary movement to said rod, the means for reciprocating the operating rod including crank disks, a cross head connected by pitmen with the crank disks, and a bearing block for the cross head fitted upon the operating rod, means being provided for varying the adjustment of the pitmen with relation to the crank disks to vary the length of throw of the operating rod.

In testimony whereof I affix my signature.

WARREN K. MOORE.